United States Patent
Molina Cabrera et al.

(10) Patent No.: US 11,191,413 B2
(45) Date of Patent: *Dec. 7, 2021

(54) SYSTEM AND METHOD OF MONITORING CONSUMABLE WEAR COMPONENTS OF SEMI-AUTONOMOUS FLOOR CARE EQUIPMENT

(71) Applicant: Avidbots Corp, Kitchener (CA)

(72) Inventors: Pablo Roberto Molina Cabrera, Waterloo (CA); Derek Kursikowski, Kitchener (CA)

(73) Assignee: Avidbots Corp, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,135

(22) Filed: Oct. 1, 2020

(65) Prior Publication Data
US 2021/0015330 A1 Jan. 21, 2021

Related U.S. Application Data

(63) Continuation of application No. 16/283,875, filed on Feb. 25, 2019, now Pat. No. 10,827,901.

(51) Int. Cl.
*A47L 11/40* (2006.01)
*G08B 21/24* (2006.01)
*G06K 19/06* (2006.01)
*G06K 19/07* (2006.01)

(52) U.S. Cl.
CPC .... *A47L 11/4011* (2013.01); *G06K 19/06028* (2013.01); *G06K 19/06037* (2013.01); *G06K 19/0723* (2013.01); *G08B 21/24* (2013.01); *A47L 2201/00* (2013.01)

(58) Field of Classification Search
CPC .................................................. A47L 11/4011
See application file for complete search history.

(56) References Cited

U.S. PATENT DOCUMENTS

2003/0205492 A1* 11/2003 Ferber .................... A61C 17/22
206/362.2
2016/0270618 A1* 9/2016 Lu ........................ A47L 11/4061

* cited by examiner

Primary Examiner — Travis R Hunnings

(57) ABSTRACT

In some embodiments, a method of monitoring, analyzing, and/or validating the lifecycle and maintenance schedule of consumable wear components used in or by a semi-autonomous cleaning device can include scanning a unique identifier associated with a consumable component and receiving, at the cleaning device, data associated with the unique identifier. A signal associated with the data is sent from the cleaning device to a host device. After scanning the unique identifier, the consumable component is installed in or on the cleaning device. During use of the cleaning device, a status of the consumable component is monitored and a signal is sent to the host device in response to one or more characteristics associated with the consumable component meeting a criterion.

22 Claims, 9 Drawing Sheets

SYSTEM AND METHOD OF MONITORING CONSUMABLE WEAR COMPONENTS OF SEMI-AUTONOMOUS FLOOR CARE EQUIPMENT

CROSS REFERENCE TO RELATED APPLICATIONS

The application claims priority to and the benefit of U.S. Provisional Patent Application Ser. No. 62/634,542, entitled "MONITORING CONSUMABLE WEAR COMPONENTS OF SEMI-AUTONOMOUS FLOOR CARE EQUIPMENT", filed on Feb. 23, 2018, the disclosure of which is incorporated herein by reference in its entirety. The application is also a US continuation application of U.S. application Ser. No. 16/283,875, entitled "SYSTEM AND METHOD OF MONITORING CONSUMABLE WEAR COMPONENTS OF SEMI-AUTONOMOUS FLOOR CARE EQUIPMENT", filed on Feb. 25, 2019, the disclosure of which is incorporated herein by reference in its entirety.

BACKGROUND

The embodiments described herein relate to semi-autonomous cleaning devices and more particularly, to a method and system for monitoring, analyzing, and validating the lifecycle and maintenance schedule of consumable wear components such as, for example, squeegees, brushes, pads, and/or the like used by or on floor care equipment including but not limited to semi-autonomous cleaning devices such as floor scrubbers.

The use of semi-autonomous or fully autonomous devices configured to perform a set of tasks is known. For example, robots can be used to clean a surface, mow a lawn, collect items from a stocked inventory, etc. In some instances, however, some known robots fail to provide a user with an indication of the robot's position, progress, and/or status of one or more. For example, monitoring consumable wear components and/or scheduling consumable replacement is a present challenge in the floor care industry. It has been identified that floor care equipment, such as scrubbers, require consumable components to be monitored and replaced routinely to ensure desired performance. Neglecting or forgetting to change the consumables reduces the ability of the machine to clean properly and/or properly pick up water.

Some self-driving scrubbers (e.g., semi-autonomous and/or fully autonomous cleaning devices or robots) can perform without an operator present. As such, there is a need for the robot to be able to monitor performance and lifecycle of consumables. In addition to proper performance an undetected failure, such monitoring could also limit and/or prevent potential safety hazards such as, for example, debris or liquids left on the floor because of neglected maintenance. Accordingly, it is desired to have built-in, integrated, and/or on-board system and method to allow for the monitoring of the life of consumables and the scheduling of replacements.

SUMMARY

Systems and methods for monitoring, analyzing, and validating the lifecycle and maintenance schedule of consumable wear components such as, for example, squeegees, brushes, pads, and/or the like used by or on floor care equipment including but not limited to semi-autonomous cleaning devices such as floor scrubbers are described herein. For example, the systems and/or methods described herein can record when a new consumable has been installed on a cleaning robot and can alert an operator when it is time to replace it. For example, the systems and/or methods can intelligently predict when brushes, pads, squeegees, and/or any other suitable consumable component need replacement based on the way that the brushes, pads, squeegees, etc. are being used by the machine (e.g., pressure settings, type and finish of floor, and/or the like). In addition, an onboard computer system can control the maintenance schedule, validate that routine maintenance was completed, and have access to the actual consumption data to perform analytics.

In some embodiments, a method of monitoring, analyzing, and/or validating the lifecycle and maintenance schedule of consumable wear components used in or by a semi-autonomous cleaning device can include scanning a part using an information capture system. The part may have a label, ID tag or other explicit identifier, or may be identified visually or by some other means to create one or more part identifiers. The part identifier and/or data associated with a consumable component is received at the cleaning device, where additional data associated with the identifier can be referenced. In some embodiments, the part number is either a unique number for the part type, or in other embodiments the number may be unique for a specific part of a specific type. A signal associated with the data is sent from the cleaning device to a host device, or a cloud computing processor. After scanning the unique identifier, the consumable component is installed in or on the cleaning device. During use of the cleaning device, a status of the consumable component is monitored and a signal is sent to the host device in response to one or more characteristics associated with the consumable component meeting a criterion. The consumable component may be one specific wear component such as a squeegee, replaceable roller or brush head, or may be an assembly containing one or more consumable components, such as a module consisting of components that may wear.

DETAILED DESCRIPTION

Figure 1:
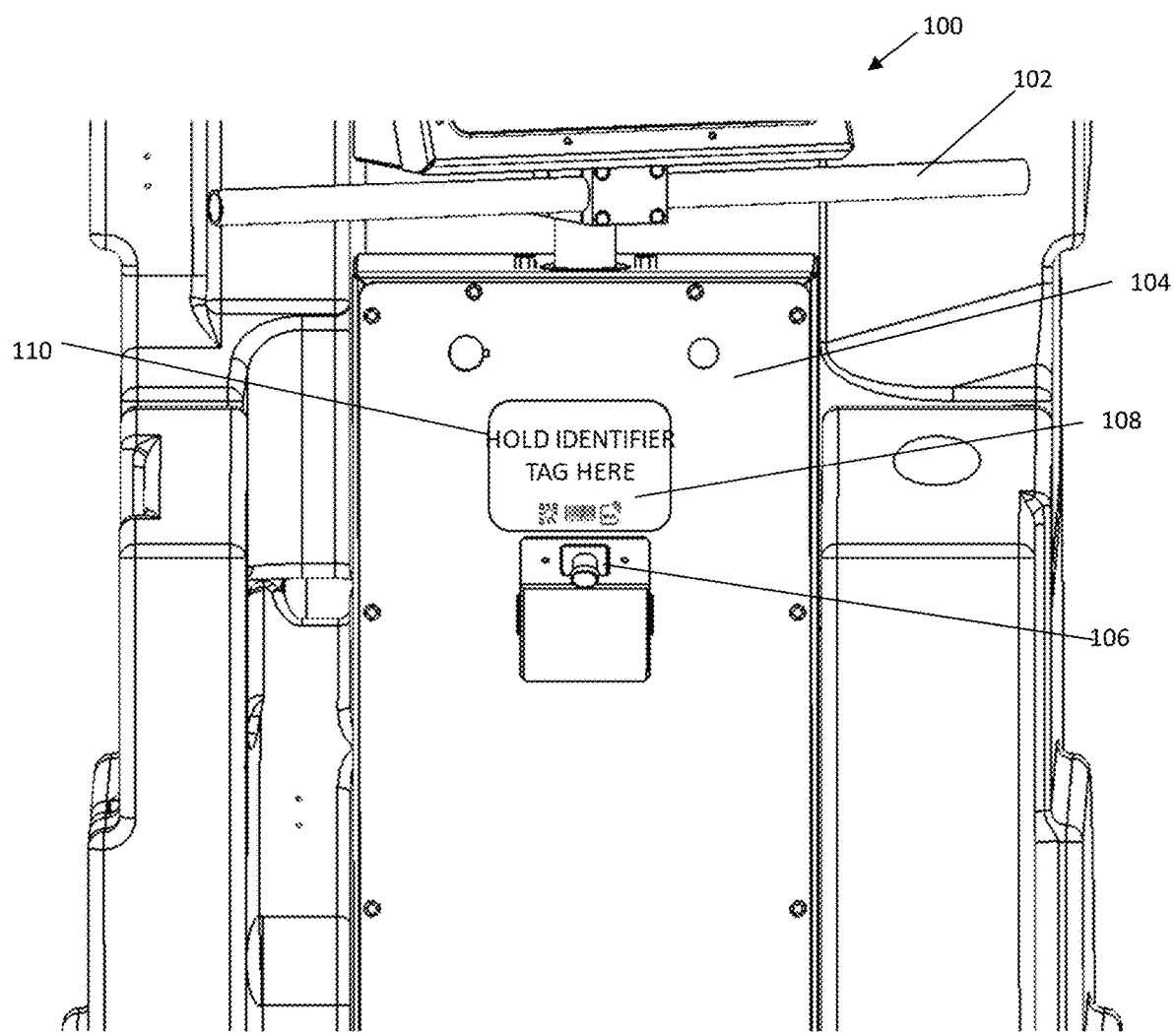
FIG. 1 is a rear view of a semi-autonomous cleaning device, illustrating a rear camera and/or transceiver according to an embodiment.

The systems and/or methods described herein can be used on any suitable device, machine, system, robot, etc. For example, in some embodiments, the systems and methods described herein can be used with and/or on a semi-autonomous cleaning robot or the like. In some embodiments, such a semi-autonomous cleaning robot can be similar to or substantially the same as any of those described in U.S. Patent Publication No. 2016/0309973 entitled, "Apparatus and Methods for Semi-Autonomous Cleaning of Surfaces," filed Apr. 25, 2016 (referred to herein as the "'973 publication"), the disclosure of which is incorporated herein by reference in its entirety.

In some embodiments, a unique identifier can be incorporated in, on, and/or otherwise provided with consumables that are provided to an operator, user, and/or customer. For example, the consumables can include one or more surface features such as but not limited to a barcode, a quick response (QR) code, a color code or pattern, and/or the like. In some embodiments, the consumables can include an embedded technology such as, for example, a radio-frequency identification (RFID) tag, a Near Field Communication (NFC) tag, and/or the like. Using an identifying device of the cleaning device or robot (e.g., a camera, scanner, transceiver or other reader technology, etc.), the data associated with the unique identifier can be received, sensed, and/or determined. In some embodiments, data associated with the unique identifier can be registered either by the cleaning device or via a host device in communication with the cleaning device via one or more network(s). With the data at least temporarily stored, it can be possible to determine when a consumable component has been replaced and, in some instances, the cleaning device and/or the host device can aide in and/or can define a maintenance schedule for the consumable component.

In addition, data associated with the consumable component and/or a status of the consumable component can be displayed via a user interface. In some embodiments, the user interface can be included in and/or can be in communication with the cleaning device. In other embodiments, the user interface can be included in and/or can be in communication with the host device. In some embodiments, the user interface can be included in an external electronic device such as, for example, a personal computer, laptop, tablet, mobile device, smartphone, remote control device, and/or the like. In such embodiments, the external electronic device can be in communication with the cleaning device and/or the host device via any suitable network(s). Thus, the status of each cleaning device and/or each consumable component can be monitored via the user interface. For example, in some instances, users, technicians, managers, etc. can view and/or monitor the current health of one or more consumable components for their fleet (e.g., a group, class, or collection of cleaning devices) as well as see the history of previous consumable components. In some instances, the users can be notified that it is desirable for maintenance or replacement of a consumable component based on machine analytics of the cleaning device (or the host device). In some instances, such a system and/or method can also allow for inventory tracking with the potential to automate the ordering process as consumable inventory is depleted.

In some embodiments, technology onboard a cleaning device such as, for example, a camera, vision system, scanner, reader, transmitter/receiver pair, and/or the like, can read and/or receive information or data from a unique identifier of a consumable or component when it is being installed in or on the cleaning device and/or when the cleaning device or consumable is being serviced. The consumables for the system can be provided (e.g., from a manufacturer) with a unique identifier that is either surface mounted or embedded. These identifiers are utilized by the system during regular service and replacement to act as input data for the cleaning device.

In some embodiments, the cleaning device and/or a compute device included therein (e.g., such as those included in the cleaning devices described in the '973 publication) can include and/or can perform onboard analytics to monitor performance of a consumable in substantially real-time while comparing overall runtime against a maintenance schedule associated with the consumable to ensure safe and/or desirable performance. In some instances, the described system provides a streamlined method for a user or customer to comply with a predetermined and/or desired maintenance and service schedule to ensure the floor care equipment is operating in a desired manner. Historic patterns, for example the number of linear meters cleaned with a specific consumable component type can be collected in a database and used to improve the estimate of when that consumable component will require replacement in the future. In addition, other variables, such as measurement of smoothness of the floor being cleaned, and measurement of the overall dirtiness of the floor can also be used to refine the calculation of the estimate of when that consumable component will require replacement.

In addition to generally identifying the consumable components, the consumable components can also be classified by manufacturer, quality grade, hardness, shape, component materials, or other material properties in the component identifier. For example, a consumable squeegee of a soft rubber durometer may require replacement after a certain number of linear meters of cleaning, whereas a harder durometer squeegee may require replacement after a larger number of meters of cleaning.

FIG. 1 is a rear view illustrating a portion of an autonomous or at least semi-autonomous cleaning device 100 according to an embodiment. The autonomous or at least semi-autonomous cleaning device 100 (also referred to herein as "cleaning device," "device," "robot," and/or "floor scrubber") can be any suitable device, machine, system, robot, etc. configured to clean, scrub, or otherwise move along a surface in an at least semi-autonomous manner. For example, in some embodiments, the cleaning device 100 can be similar to or substantially the same as any of the cleaning devices described in the '973 publication. While described as a "semi-autonomous" cleaning device 100, it should be understood that the cleaning device 100 can be fully autonomous or can include one or more systems, subsystems, components, etc. configured to function autonomously. Accordingly, the term "semi-autonomous" is not intended to be limiting to a cleaning device that functions in a partially autonomous manner. In addition, the methods described herein can similarly be applied to other autonomous or semi-autonomous cleaning systems including vacuum cleaning systems and the like.

As illustrated in FIG. 1, the backside of the floor scrubber 100 has steering controls with an operator or user interface 102. In some embodiments, a rear electrical panel 104 can house a rear-facing camera 106 and/or an embedded chip reader 108. When the on-board computer of the floor scrubber 100 determines that a consumable component requires service or replacement, the operator or user interface 102 can provide and/or display an indication that signals to the operator to perform one or more maintenance or service actions. For example, in some instances, the user interface 102 can provide and/or display and indication that it is desirable to maintenance, service, and/or replace one or more squeegees, brushes, pads, and/or any other suitable consumable. In some instances, a unique identifier associated with a consumable can be either held in front of the camera 106 if it is a surface identifier such as a barcode or held up against the tag reader 108 if it is utilizing embedded technology (e.g., RFID, NFC, etc.). In some embodiments, the rear electrical panel 104 can include a label 110 to indicate to an operator where on the floor scrubber 100 to place the unique identifier of the consumable to allow the floor scrubber 100 to correctly read the data. In some embodiments, the label 110 can also include an image and/or any other suitable indication configured to indicate to the operator which type of technology is supported (e.g., a surface identifier such as a barcode or QR code, or an embedded identifier such as an RFID or NFC tag). Rear-facing camera 106 is one example of an information capture system. Other examples of information capture systems include other types of sensors that may capture optical signals, electrical signals, or radio frequency signals through a radio frequency interface.

Figure 2:
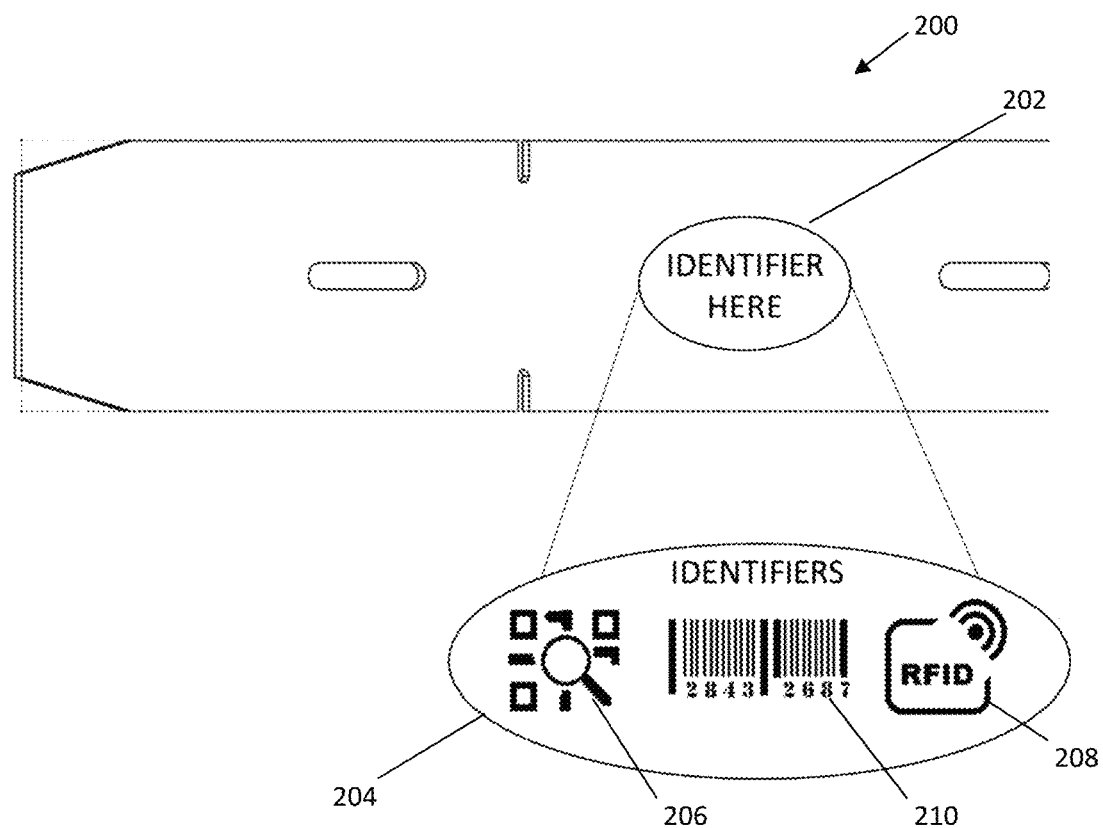
FIGS. 2-4 each illustrate an example of an identifier associated with a consumable component each according to an embodiment.

FIG. 2 illustrates a squeegee 200 for use with a floor scrubber (e.g., the floor scrubber 100) that shows an example of identifiers 202 visible to an operator. Some of the possible identifiers 204 are illustrated. For example, the squeegee 200 can include a QR code 206, a barcode 210, and/or any other image (i.e., a visual image, a logo, a company name, a trademark), which can be printed directly onto a surface of the squeegee 200. Such identifiers can be used, for example, on or with a floor scrubber including a camera or other image-detecting device for identifying the identifiers. Alternatively or in addition, the squeegee 200 can contain an embedded technology, such as a radio-frequency identification (RFID) tag 208. In some embodiments, the squeegee 200 can include a symbol or the like that can be printed on a surface of the squeegee 200 to identify the RFID tag 208 (and/or any other suitable tag). Although not shown in FIG. 2, in some embodiments, the squeegee 200 can include a transmitter/receiver technology having a sticker or the like with an embedded circuit, which is placed on and/or adhered to a surface of the squeegee 200. Other embodiments of the component identification mechanism could include a wire connected interface to an ID module on the component, or a RF based short range wireless LAN such as Bluetooth, Bluetooth Low Energy, or 802.11. The network could periodically check for the presence of recognized components and be able to recognize when components are either removed or added to the cleaning system. In another embodiment, the wear components also contain sensors that indicate the integrity or wear of the component. This information can be passed to the central control system for further processing. For example, a squeegee could contain a sensor that indicates when the squeegee has been shortened by abrasion to a point where it is compromised. This sensor could be composed of resistive and conductive elements embedded in the squeegee. The sensor element in this embodiment is connected to either a wire or to a small microprocessor that would in turn, be connected wirelessly to the central control system.

Figure 3:
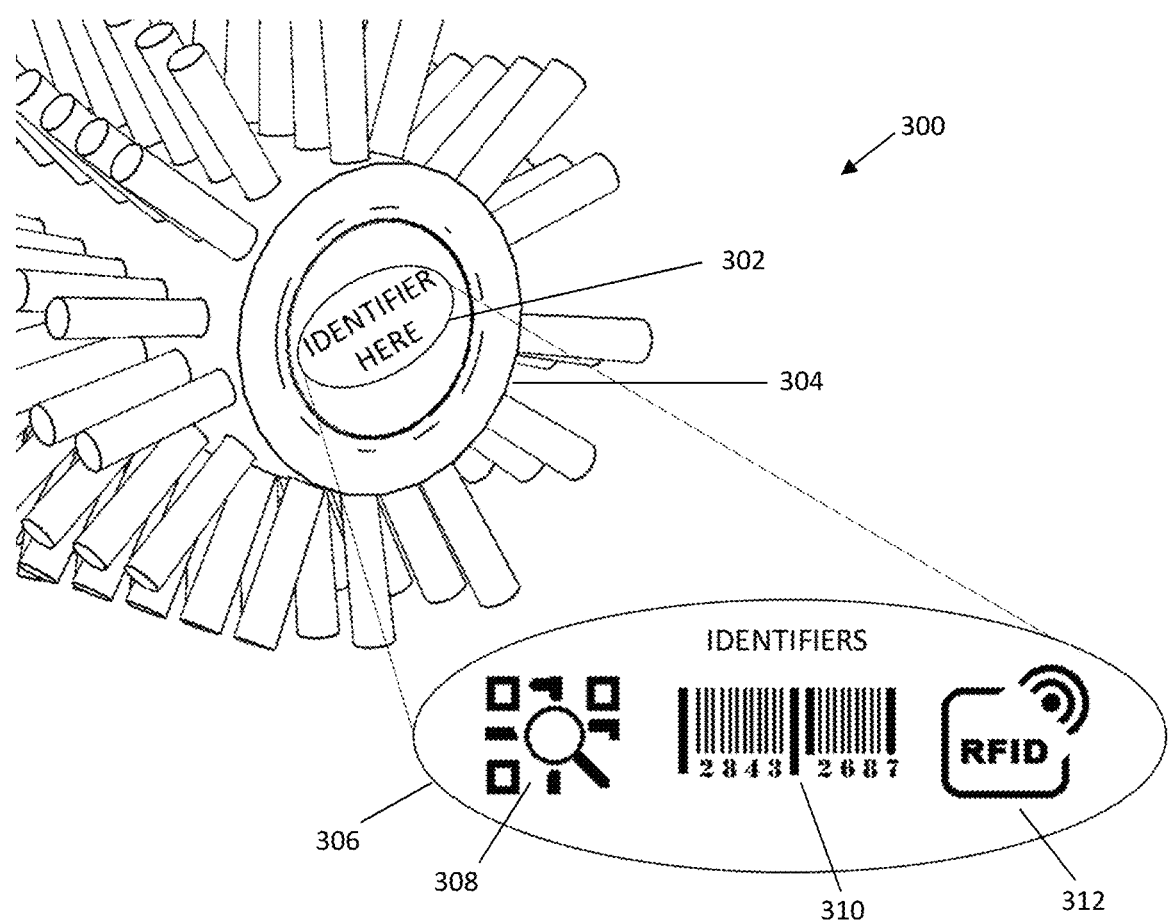
Figure 4:
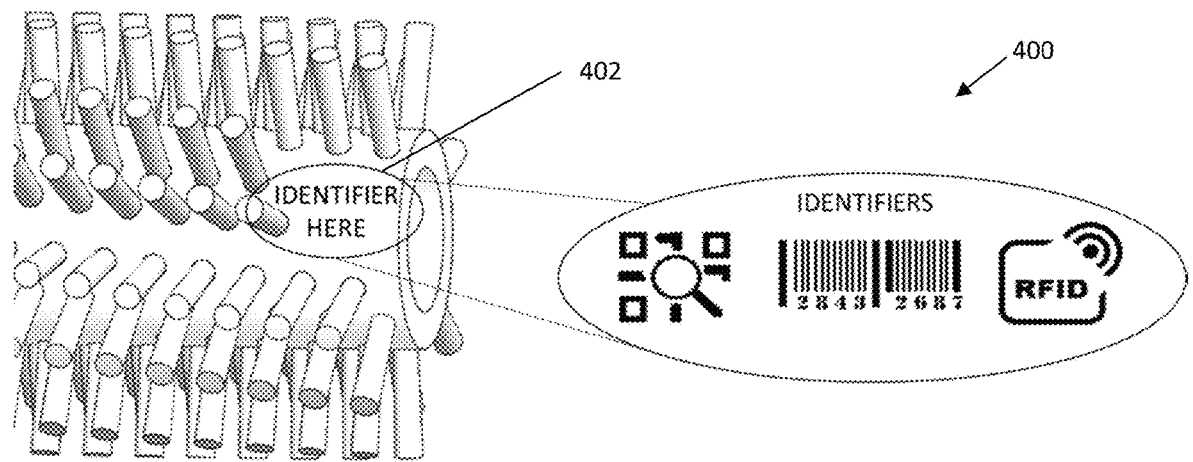

FIG. 3 illustrates a cylindrical brush 300 for use with a floor scrubber (e.g., the floor scrubber 100) that shows an example of identifiers 302 visible to an operator. For consumables that might not have an accessible surface for printing on or affixing an identifier to, such as the brush 300 or the like, the consumable can include a removable tag 304. Some of the possible identifiers 306 are illustrated. For example, if the floor scrubber is utilizing a camera for recognition, the brush 300 can include a QR code 308, a barcode 310, and/or any other suitable image printed directly onto the surface and/or otherwise at least temporarily coupled to the surface. If the floor scrubber contains a sensor, reader, transceiver, etc. configured for use with an embedded technology, the brush 300 can include an identifier such as a radio-frequency identification (RFID) tag 312. In some embodiments, the brush 300 can include a symbol or the like that can be printed on and/or at least temporarily coupled to the surface of the brush 300. Although not shown in FIG. 3, in some embodiments, the brush can include a transmitter/receiver technology having a sticker or the like with an embedded circuit, which is placed on and/or included in the removable tag 304. While the brush 300 is particular described above, FIG. 4 illustrates a brush 400 with identifiers 402 affixed to an outer cylindrical surface (e.g., rather than an end surface as shown in FIG. 3).

Figure 5:
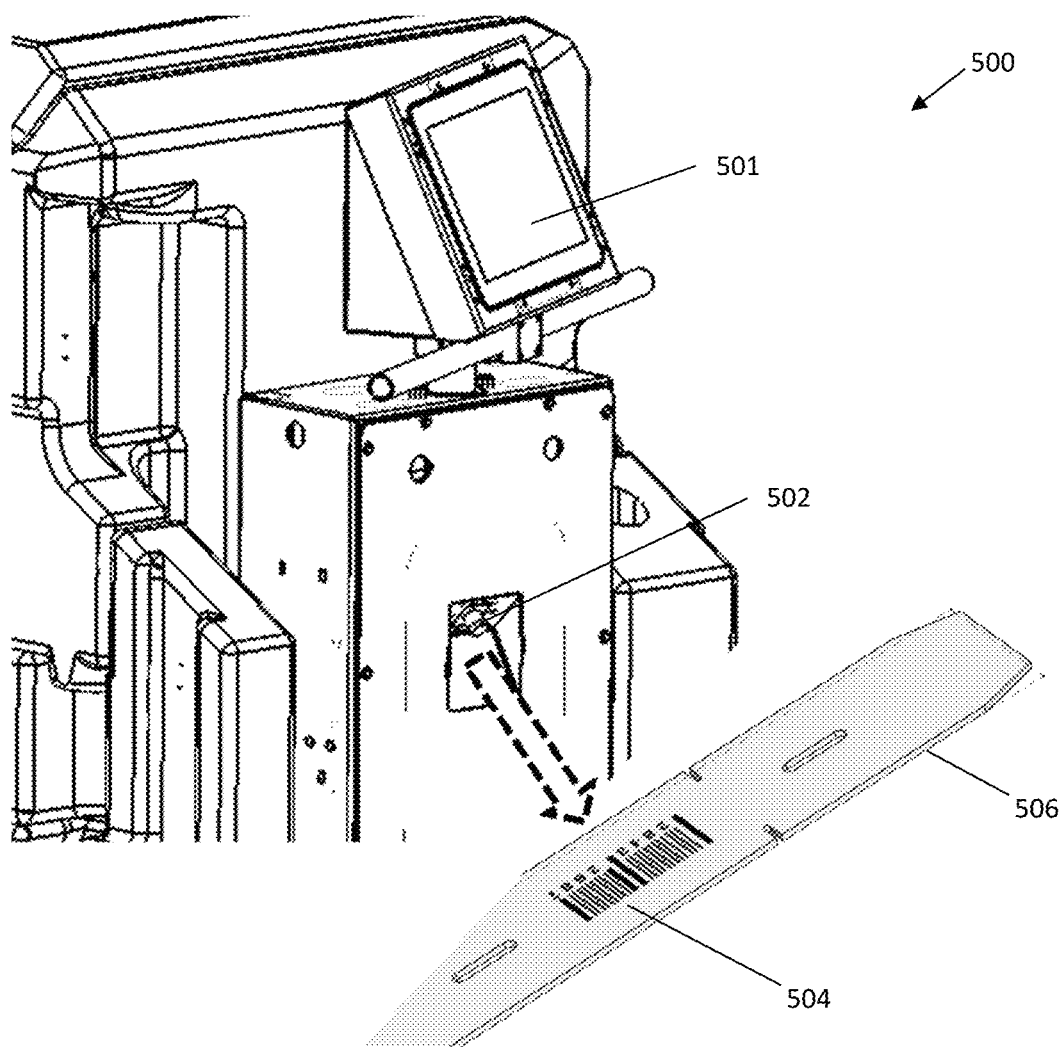
FIGS. 5 and 6 each illustrate an example of a semi-autonomous cleaning device being used to identify an identifier associated with a consumable component each according to an embodiment.

FIG. 5 shows an example of a system in operation according to an embodiment. In some embodiments as illustrated in FIG. 5, the floor scrubber system 500 (e.g., the floor scrubber 100) can include an operator or user interface 501. The user interface 501 may include a display, a screen or a touchscreen display. In further embodiments, user interface 501 may also encompass a display on a mobile device, tablet or laptop computer. The user interface 501 can be configured to present a service message that can alert an operator that maintenance is desired. In the example shown in FIG. 5, the floor scrubber can include a camera 502 that can be used, for example, to scan a barcode 504 (or other suitable code, pattern, color, and/or identifier) printed on a squeegee 506. Such a method can be substantially similar for any other reader system such as those described herein (e.g., a reader configured to identify a surface printed identifier or an embedded identifier).

Figure 6:
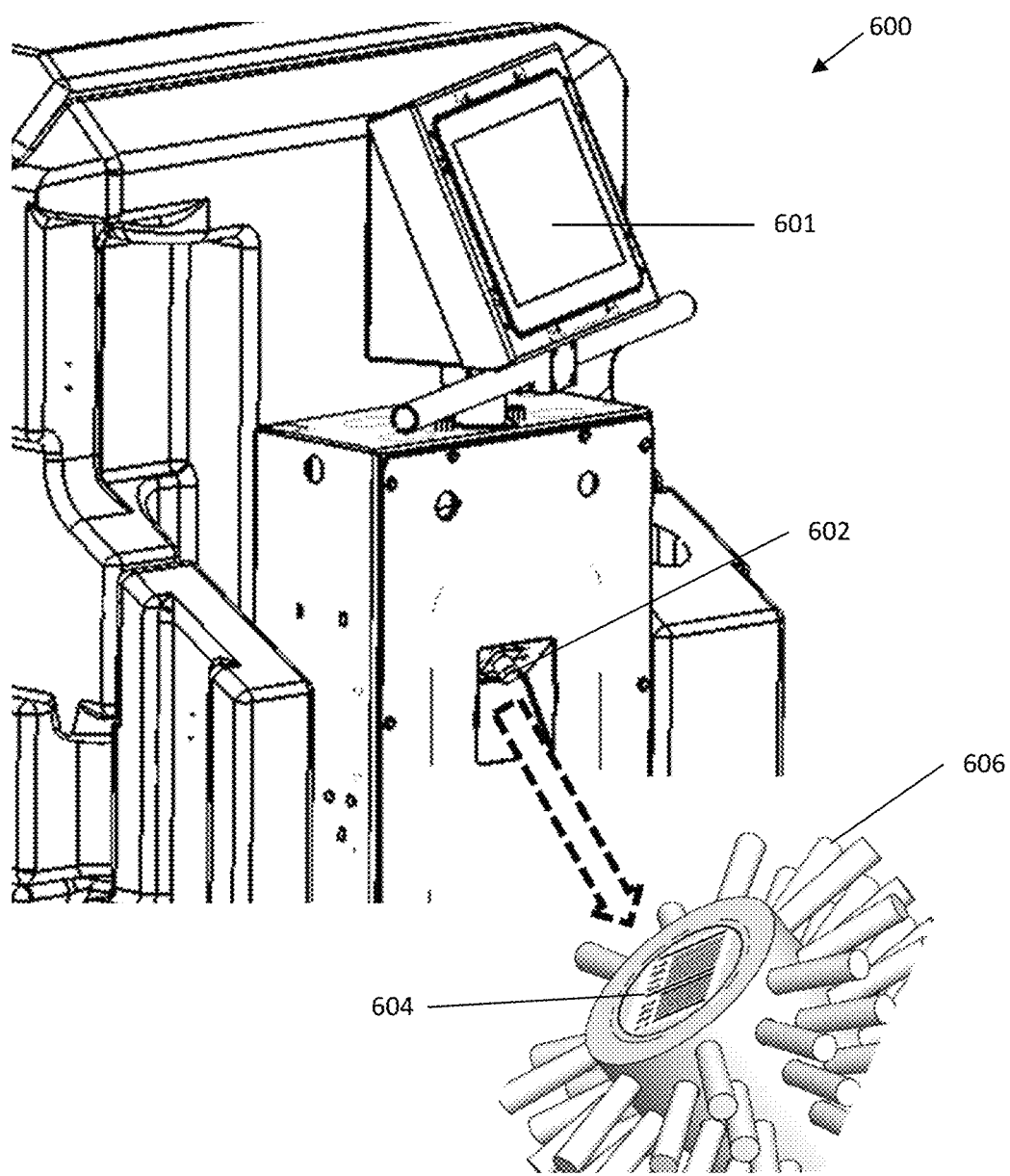

FIG. 6 shows an example of a system in operation according to an embodiment. In some embodiments, a floor scrubber system 600 (e.g., the floor scrubber 100) can include an operator or user interface 601 (e.g., a display, a screen, a touch screen, etc.). The user interface 601 can be configured to present a service message that can alert an operator that maintenance is desired. In the example shown in FIG. 5, the floor scrubber can include a camera 602 that can be used, for example, to scan a barcode 604 (or other suitable code, pattern, color, and/or identifier) printed on a brush 606. Such a method can be substantially similar for any other reader system such as those described herein (e.g., a reader configured to identify a surface printed identifier or an embedded identifier).

Figure 7:
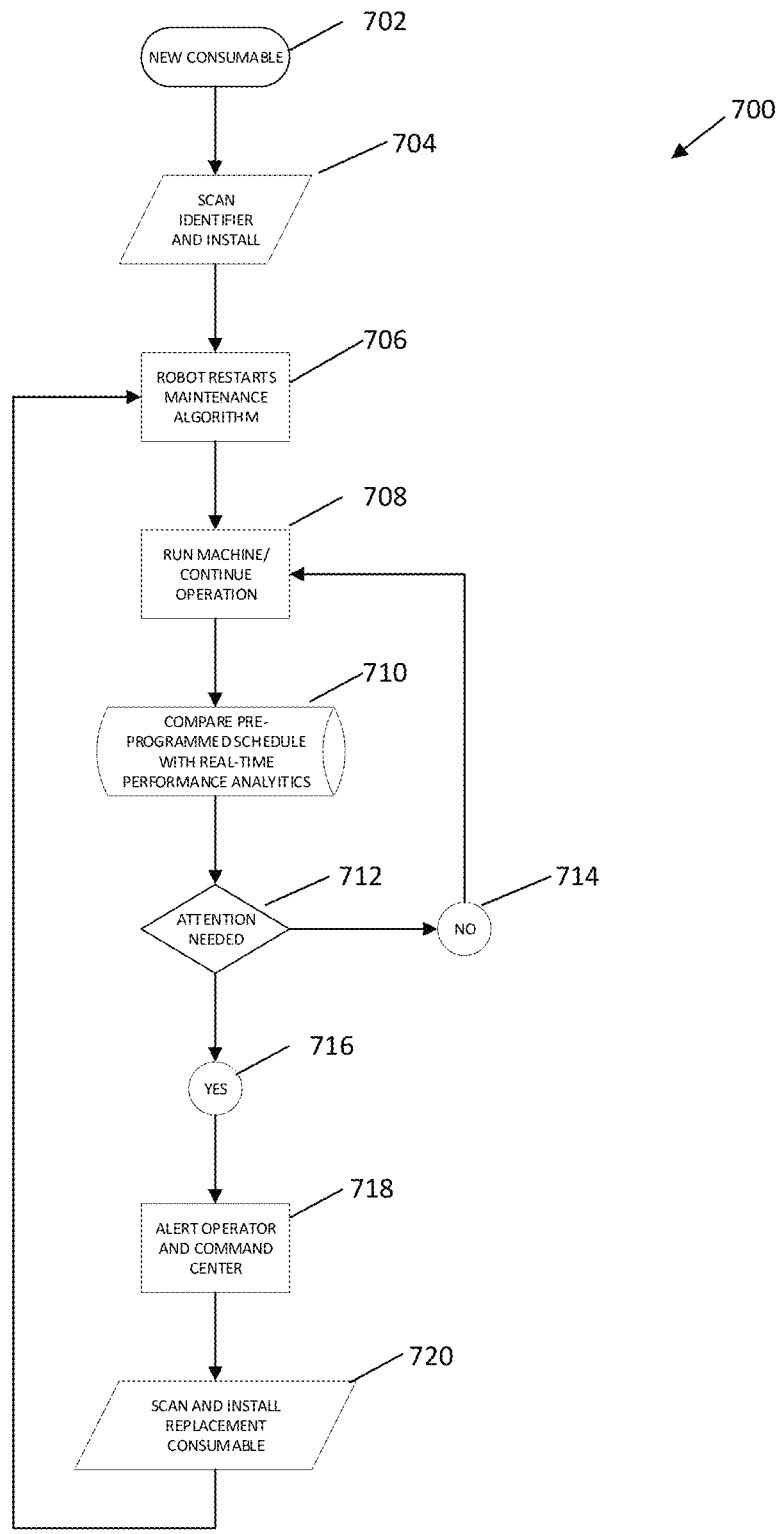
FIG. 7 is a flow chart illustrating a method of monitoring, analyzing, and/or validating a lifecycle and/or maintenance schedule of a consumable wear component according to an embodiment.

FIG. 7 is a flow chart illustrating a method and system for monitoring one or more consumables. For example, the method starts at step 702 where a new consumable such as, but not limited to a squeegee or brush, is provided. A unique identifier associated with and/or included in or on the consumable is then scanned (e.g., via a reader of a floor scrubber as described above), and the consumable is installed on the floor scrubber at step 704. A computing device included in the floor scrubber or included in a host device defines a maintenance schedule algorithm, which is then restarted or initialized at step 706.

The floor scrubber would then initiate operation or continues to operate normally at step 708. In some embodiments, the robot (floor scrubber) can be pre-programmed with a default maintenance schedule to follow at step 710. This maintenance schedule can be customized with real-time analytics that ensure desired performance to determine if attention (e.g., user intervention, maintenance, and/or service) is needed, at step 712. If the maintenance schedule determines that there is no need for service, the floor scrubber can continue to operate as normal wherein the flow chart reverts back to step 708. However, if service is requires or desirable at step 712, an operator and/or command center (e.g., host device) can be notified at step 718 through an alert message and/or any other suitable indications such as an email, a text message or short message service (SMS), an audio notification, a tactile vibration, a sound, a phone call or a voice message.

In some instances, when the operator scans and installs a replacement consumable component at step 720, the floor scrubber can reset, restart, and/or initialize the maintenance algorithm at step 706. A sensor on the consumable component is monitored to adjust the maintenance algorithm. In further embodiments (not shown), subsequent alerts can be provided until the worn component has been replaced and/or the floor scrubber is prevented from further operation until the worn component has been replaced.

Figure 8:
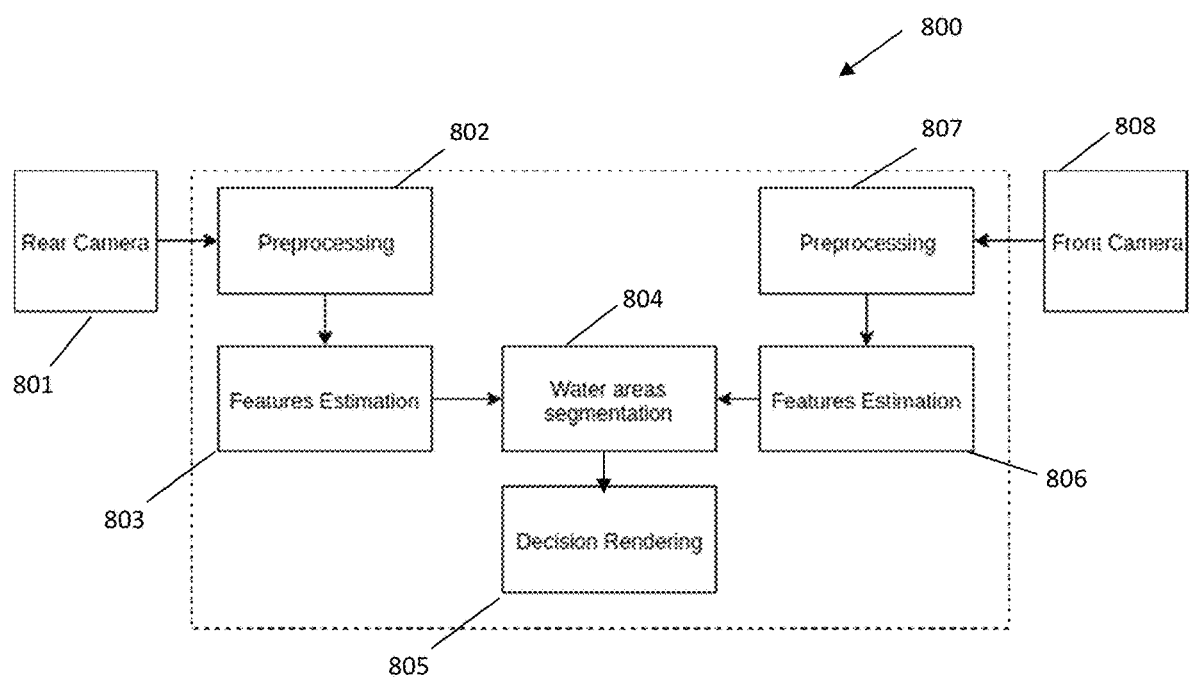
FIG. 8 is a block diagram showing the interconnection of the functional modules used for visual streak detection by the floor scrubber.

FIG. 8 is a block diagram showing the interconnection of the functional modules used by the floor scrubber (e.g., the floor scrubber 100, 500, and/or 600). The block diagram 800 of FIG. 8 includes a Front Camera 808 that is mounted on the front of the floor scrubber, generally pointing in the direction of travel for the floor scrubber. The Front Camera 808 feeds the continuous image to the Preprocessing unit 807, which filters and transforms the image to a reference image. The Preprocessing Unit 807 applies image processing filters on the input image to remove noise, reduce size or transform to another space. These operations can be done with OpenCV or with other similar software libraries. The preprocessor outputs video data to the Features Estimation unit 806. The Features Estimation Unit 806 extracts edge, color and texture features from the preprocessed image. These operations could be done with OpenCV libraries or coded using algorithms found in well-known image processing literature.

Furthermore, system 800 also has a Rear Camera 801, that is mounted on the rear of the floor scrubber, generally pointing opposite the direction of travel for the floor scrubber. The Rear Camera 801 feeds the continuous image to the Preprocessing unit 802, which filters and transforms the image to an image of interest. As is known in image processing technology, the continuous image stream may be sampled periodically to provide a series of static images for use in further image processing. The Preprocessing Unit 802 applies image processing filters on the input image to remove noise, reduce size or transform to another space. The two image streams coming from Features Estimation unit 806 and Features Estimation unit 803 are compared in Water Areas Segmentation unit 804. The Water Areas Segmentation Unit 804 examines the generated edge, color and texture features from both rear and front cameras and provides a likelihood for different image areas to be covered with water. A learning-based mechanism such as Support Vector Machine (SVM) can be used. In addition, and not shown, would be a comparison delay equivalent to the transit time for floor scrubber between the two cameras, so that the comparison is on the same area of the floor, pre and post cleaning. The Decision Rendering unit 805, takes the output of the Water Areas Segmentation unit 804 and decides on the presence of water patches and generate appropriate notifications.

Figure 9:
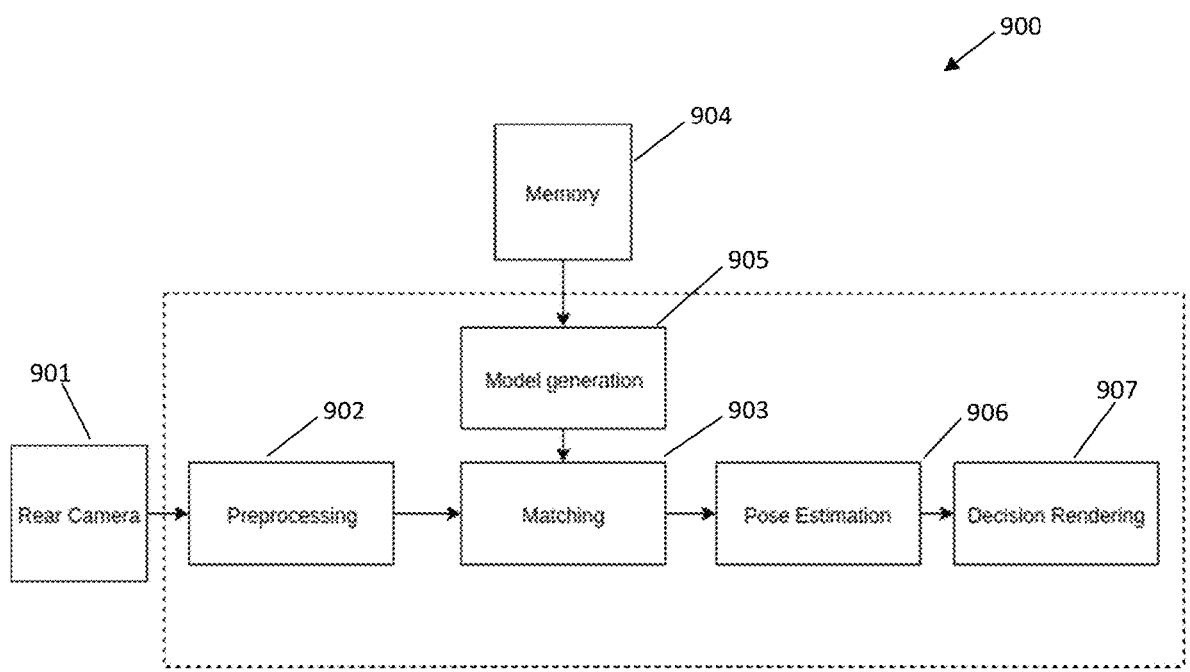
FIG. 9 shows a system block diagram for a detection algorithm.

FIG. 9 shows a system block diagram for monitoring one or more consumables. The block diagram 900 of FIG. 9 includes a Rear Camera 901 that sends continuous video output to Preprocessing unit 902. Preprocessing unit 902 provides discrete features extraction and/or applies image processing filters on the input image to remove noise, reduce size or transform to another space. These operations could be done with OpenCV or with similar software libraries. The output of the Preprocessing unit 902 is fed into the Matching unit 903. The Memory 904 contains reference features encoded to facilitate easy comparison the features identified by the Rear Camera 901. The Memory 904 also contains information on where in the visual field the identified objects should be placed. The Memory 904 feeds into the Model Generation unit 905, that creates a model for comparison to the actual features and position observed by the Rear Camera 901. Model generation could be as simple as retrieving a template or a set of features from memory, or it could involve rotating, resizing or subdividing the template or model to match against different possible location and orientations of the squeegee in the image. These operations could be done with the help of standard computer vision or computer graphics libraries such as OpenCV and or OpenGL.

The Matching module 903, compares discrete features by comparing their descriptors which could be done using an algorithm like RANSAC for example which is also available in OpenCV, or by performing patch matching. This can be done with standard techniques available in opensource libraries or coded following well known image processing algorithms. The output of the Matching unit 903 feeds into the Pose Extraction unit 906. Pose estimation uses the results of matching to generate a hypothesis (or hypotheses) about the pose of the squeegee in the image, including a confidence estimation. The Decision Rendering unit 907, utilizes the results of pose estimation to determine whether the squeegee or any of its visually identifiable (visually monitored) mechanical components such as squeegee, squeegee assembly, bolts, carrier, or idler wheels are in the correct position, misaligned, trailing behind the robot or totally absent and generate appropriate notifications and corrective actions. Identifying misplaced or misaligned components is particularly crucial for removeable, replaceable, or disposable parts such as rear squeegee rubbers and idler wheels. While in this implementation, the camera position is advantageously directed to the rear of the device and towards the rear squeegee assembly, other implementations may benefit from cameras other positions, including at the underside, rear, front or side of the floor scrubber.

In another embodiment, the system compares the intensity gradients of a front facing camera with the gradient of a rear facing camera to account for baseline intensity gradients of the surface being cleaned. Some delay or hysteresis is added to the signaling algorithm, for situations where the intensity gradient of the surface being cleaned is changing due to different patterns in the surface.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made.

Although various embodiments have been described as having particular features, concepts, and/or combinations of components, other embodiments are possible having any combination or sub-combination of any features, concepts, and/or components from any of the embodiments described herein. The specific configurations of the various components can also be varied. For example, the specific size, specific shape, and/or specific configuration of the various components and/or various inputs or outputs can be different from the embodiments shown, while still providing the functions as described herein. The size, shape, and/or configuration of the various components can be specifically selected for a desired or intended usage.

Where methods and/or events described above indicate certain events and/or procedures occurring in certain order, the ordering of certain events and/or procedures may be modified and that such modifications are in accordance with accepted and/or desired variations of the specific embodiments. Additionally, certain events and/or procedures may be performed concurrently in a parallel process when possible, as well as performed sequentially as described above. Certain steps may be partially completed or may be omitted before proceeding to subsequent steps.

What is claimed:

1. A computer-implemented method of monitoring usage of one or more consumable components of a floor care equipment, the method comprising:
   scanning a consumable component on the floor care equipment using an information capture system, the consumable component having at least one identifier that contains information relating to the consumable component;
   installing the consumable component on the floor care equipment;
   adjusting a maintenance schedule algorithm on the computer associated with the floor care equipment taking into consideration that the consumable component has been installed;
   monitoring operation of the floor care equipment; and
   providing an alert indicating that the consumable component should change;
   wherein the information capture system is located in the front or rear of the floor care equipment.

2. The method of claim 1 wherein the information capture system is selected from a list consisting of a camera, an optical signal, an electrical signal, or a radio frequency interface.

3. The method of claim 1 wherein the consumable component is a squeegee, a replaceable roller or a brush head.

4. The method of claim 1 wherein a bar code reader is used for the step of scanning of a new consumable component.

5. The method of claim 1 wherein the identifier is selected from a list consisting of a barcode, a RFID, a visual image and a QR code.

6. The method of claim 1 wherein the computer is on the floor care equipment, in a cloud computing processor, or on a host device.

7. The method of claim 1 wherein the alert is provided to an operator, the floor care equipment, a cloud computing processor or to a host device.

8. The method of claim 1 wherein the alert is selected from a list consisting of an email, a text message, an audio notification, a tactile vibration, a sound, a phone call and a voice message.

9. The method of claim 1 where the alert can be provided wirelessly to the host system or a mobile device.

10. The method of claim 1 further comprising the step of replacing the worn consumable component with an additional new component.

11. The method of claim 1 further comprising the step of preventing further operation of the floor care equipment until the worn component has been replaced or providing subsequent alerts until the worn component has been replaced.

12. The method of claim 1 wherein the floor care equipment is semi-autonomous.

13. The method of claim 1 wherein the floor care equipment is a floor scrubber system or a vacuum cleaning system.

14. A system of monitoring usage of one or more consumable component of a floor care equipment, the system comprising:
    a semi-autonomous floor care equipment;
    a computer processor, mounted on the floor care equipment;
    a front camera and rear camera, mounted on the front and rear of the floor care equipment;
    a consumable component;

wherein the computer processor enables the steps of:
- scanning the consumable component on the floor care equipment, the consumable component having at least one unique identifier that is scannable;
- revising a maintenance schedule algorithm on the computer;
- monitoring operation of the floor care equipment; and
- providing an alert indicating that the consumable component should be changed.

15. The system of claim 14 wherein the consumable component is a squeegee, a replaceable roller or a brush head.

16. The system of claim 14 wherein a measurement of smoothness of the surface being cleaned or measurement of the overall dirtiness of the floor is used as an input to the maintenance schedule algorithm.

17. The system of claim 14 wherein the unique identifier is selected from a list consisting of a barcode, a RFID and a QR code.

18. The system of claim 14 wherein at least one of the computer and the alert is on either the floor care equipment or on a host device.

19. The system of claim 14 wherein the alert is selected from a listing consisting of an email, a text message, an audio notification, a tactile vibration, a sound, a phone call and a voice message.

20. The system of claim 14 where a sensor on the consumable component is monitored to adjust the maintenance schedule algorithm.

21. The system of claim 14 wherein the computer processor further comprising the steps of comparing the intensity gradient of the front camera with a gradient of the rear camera to account for baseline intensity gradients of the surface being cleaned.

22. The system of claim 21 wherein delay or hysteresis is added to the algorithm, for situations where the intensity gradient of the surface being cleaned is changing due to different patterns in the surface.

* * * * *